US008840114B2

(12) United States Patent
Dixon et al.

(10) Patent No.: US 8,840,114 B2
(45) Date of Patent: Sep. 23, 2014

(54) ASSEMBLY COMPRISING A ROTATABLE COMPONENT

(75) Inventors: Jeffrey A. Dixon, Derby (GB); Kenneth F. Udall, Derby (GB); Richard Nicholson, Derby (GB)

(73) Assignee: Rolls-Royce PLC, London (GB)

( * ) Notice: Subject to any disclaimer, the term of this patent is extended or adjusted under 35 U.S.C. 154(b) by 38 days.

(21) Appl. No.: 13/420,100

(22) Filed: Mar. 14, 2012

(65) Prior Publication Data

US 2012/0248707 A1 Oct. 4, 2012

(30) Foreign Application Priority Data

Mar. 29, 2011 (GB) .................................. 1105182.8

(51) Int. Cl.
*F16J 15/447* (2006.01)
*F01D 25/18* (2006.01)
*F01D 11/04* (2006.01)

(52) U.S. Cl.
CPC .......... *F01D 25/183* (2013.01); *F05D 2240/55* (2013.01); *F01D 11/04* (2013.01)
USPC .......................................................... 277/412

(58) Field of Classification Search
CPC ...... F16J 15/4472; F16J 15/43; F16J 15/3292
USPC .......................................... 277/410–412, 421
See application file for complete search history.

(56) References Cited

U.S. PATENT DOCUMENTS 4,477,223 A * 10/1984 Giroux ....................... 415/168.2
5,301,957 A * 4/1994 Hwang et al. ................. 277/350
5,833,244 A * 11/1998 Salt et al. ...................... 277/421
6,142,729 A * 11/2000 Tran et al. ..................... 415/113
6,568,688 B1 * 5/2003 Boeck ........................... 277/411
2008/0056890 A1 * 3/2008 Ivakitch ..................... 415/174.4

FOREIGN PATENT DOCUMENTS

EP 1 843 011 A2 10/2007
EP 2 157 289 A2 2/2010
WO WO 2006/086945 A1 8/2006

OTHER PUBLICATIONS

British Search Report dated Jul. 22, 2011 issued in British Patent Application No. 1105182.8.

* cited by examiner

*Primary Examiner* — Kristina Fulton
*Assistant Examiner* — Nathan Cumar
(74) *Attorney, Agent, or Firm* — Oliff PLC

(57) ABSTRACT

An assembly, for example in a gas turbine engine, includes a rotatable component supported by a bearing in a support structure. A sealing arrangement includes a non-rotating sealing ring which makes sealing contact with sealing features on the rotatable component. The non-rotating sealing ring is radially displaceable with respect to the support structure by means of ribs which engage axially facing support faces of the support structure. The non-rotating sealing ring is radially located by an outer, non-rotating, race of the bearing, by means of a locating surface on a locating body of the non-rotating sealing ring. As a result of this arrangement, the running clearance at the sealing arrangement can be maintained, despite radial displacement of the rotatable component with respect to the support structure, and despite thermal and mechanical deflections of the support structure.

14 Claims, 2 Drawing Sheets

ASSEMBLY COMPRISING A ROTATABLE COMPONENT

This invention relates to an assembly comprising a rotatable component supported by a bearing for rotation relative to a support structure. The invention is particularly, although not exclusively, concerned with such an assembly in which the rotatable component is a turbine shaft of a gas turbine engine.

Figure 1:
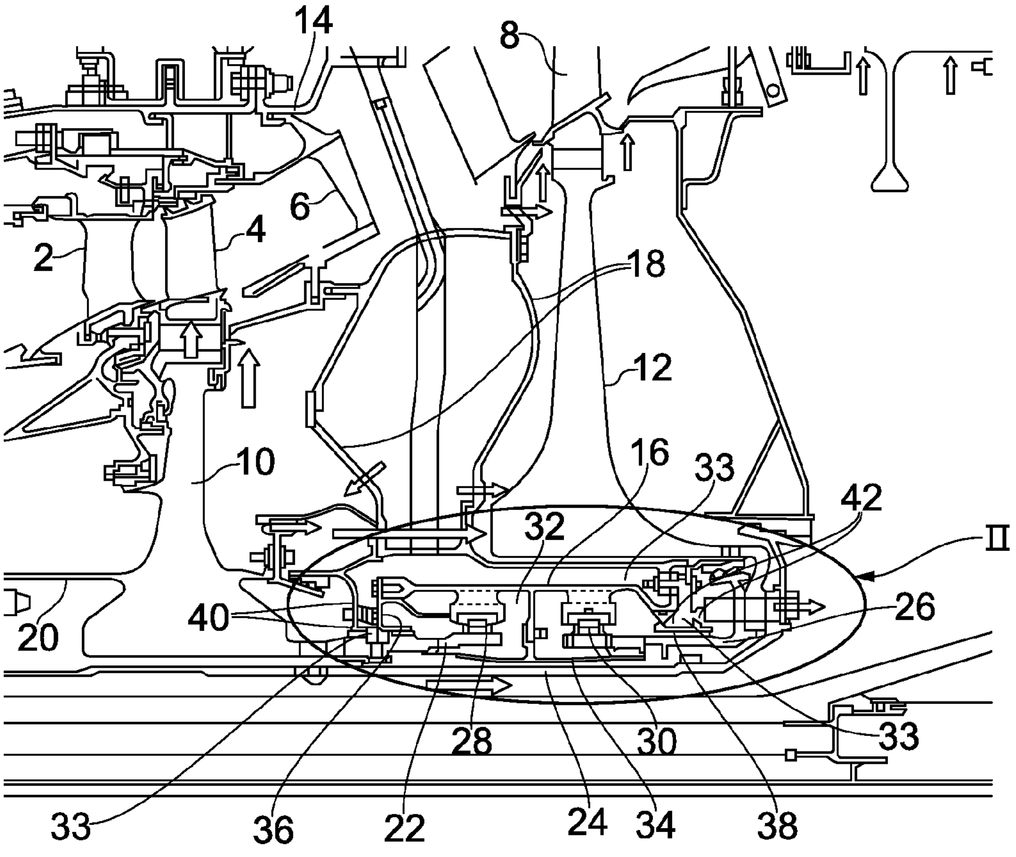

FIG. 1 shows part of the turbine section of a gas turbine engine, including a known bearing and sealing arrangement.

FIG. 1 shows a high pressure (HP) nozzle guide vane (NGV) 2, an HP turbine blade 4, an intermediate pressure (IP) NGV 6 and an IP turbine blade 8. The HP and IP turbine blades 4, 8 visible in FIG. 1 are individual blades of respective arrays, mounted on an HP disc 10 and an IP disc 12. Similarly, the HP and IP NGVs 2, 6 are individual stator vanes of arrays which are mounted within a casing 14.

A support structure 16 is supported from the casing 14 by the IP NGVs and an internal spoked structure 18. The HP disc 10 is carried by an HP shaft 20 which has an axial extension 22 projecting into the support structure 16. Similarly, the IP disc 12 is carried by an IP shaft 24 which has an extension 26 extending into the support structure 16. The extension 22 of the HP shaft 20 and the extension 26 of the IP shaft 24, and consequently the shafts 20 and 24 themselves, are supported for rotation in the support structure 16 by respective bearings 28, 30.

It will be appreciated from FIG. 1 that the bearings 28, 30 are accommodated in an annular chamber 32 defined by the stationary support structure 16 and the extensions 22, 26 of the HP and IP shafts 20, 24, and a diaphragm 34, forming part of the support structure 16, which forms a bridge between the extensions 22, 26 on their radially inner sides.

Labyrinth seals 36, 38 are provided respectively between the support structure 16 and the radially outer surfaces of the extensions 22, 26. The seals 36, 38 are required to run with relatively small radial clearances so that the flow of hot buffering air from a region 33 into the chamber 32 can be controlled to minimum levels to maintain positive pressure oil sealing of the chamber 32 while avoiding excessive increase of oil temperatures within the bearings 28, 30.

The seals 36, 38 comprise sealing rings 40, 42 which are carried by the support structure 16, and consequently by the spoke structure 18 and, ultimately, by the casing 14. The sealing rings 40, 42 cooperate with features, such as circumferential fins, on the extensions 22, 26 which thus rotate with the HP and IP shafts 20, 24. While the bearings 28, 30 nominally cause the extensions 22, 26 to rotate coaxially with the support structure 16, and consequently with the sealing rings 40, 42, in practice deviations from the nominal configuration occur. In particular, the bearings 28, 30 may employ squeeze films which entail some degree of radial movement in the bearing, enabling off-centre relative, radial movements between the non-rotating sealing rings 40, 42 and the extensions 22, 26 of the HP and IP shafts 20, 24. Also, other eccentricities and deflections may be introduced by the thermo-mechanical behaviour of the support structure 16, such as mechanical distortion arising from asymmetric loading, and differential thermal expansion in the support structure 16, the spoke structure 18 and the casing 14. Such deviations during running of the engine contribute to significant wear of the seals 36, 38, leading to larger than ideal running clearances during engine operation.

According to the present invention there is provided an assembly comprising a rotatable component supported by a bearing for rotation relative to a support structure, the bearing comprising a rotating race which is rotatable with the rotatable component and a non-rotating race carried by the support structure, the assembly also comprising a sealing arrangement comprising a non-rotating sealing ring carried radially by the non-rotating race and axially by the support structure, the non-rotating sealing ring making sealing contact with a rotating sealing feature on the rotatable component.

In such an assembly, the non-rotating sealing ring is isolated from radial deflections of the support structure. The radial support of the non-rotating sealing ring by the non-rotating race means that the non-rotating sealing ring follows any orbital motion of the rotatable component which occurs as a result of the functioning of the squeeze film in the bearing. Also, radial deflections of the support structure are not transmitted to the non-rotating sealing ring. The result is that the non-rotating sealing ring maintains its position with respect to the rotating sealing feature on the rotatable component so that wear in the sealing arrangement is minimised.

The non-rotating sealing ring may engage the support structure at cooperating axial support faces on the support structure and the non-rotating sealing ring. The axial support faces thus locate the non-rotating sealing ring in the axial direction while permitting the required radial displacement between them.

In one embodiment, the support structure has a pair of axially spaced-apart circumferential webs, each having an axial support face which is contacted by an axial support face on a respective circumferential rib on the non-rotating sealing ring. The ribs on the non-rotating sealing ring engage the respective webs on the support structure on opposite sides from each other, so that one support structure web limits axial displacement of the non-rotating sealing ring in one direction, and the other support structure rib limits axial displacement of the non-rotating sealing ring in the other axial direction. The ribs on the non-rotating sealing ring may be disposed between the webs on the support structure.

In another embodiment, a radially resilient ring is received in a groove in the support structure and is in sealing contact with the non-rotating sealing ring.

While the cooperating axial support faces on the support structure and the non-rotating sealing ring provide some sealing between those components, it may be desirable to provide additional sealing. For example, axially and radially tolerant sealing means may be provided comprising a compressible sealing element retained in a circumferential groove in an axially facing surface of one of the components which engages a radially sealing axially facing surface of the other component.

The sealing arrangement may comprise any suitable sealing mechanism. in one embodiment the sealing arrangement comprises a labyrinth seal, in which the rotating sealing feature comprises circumferential fins which engage a surface on the non-rotating sealing ring.

The radial support of the non-rotating sealing ring by the non-rotating race may be achieved by a circumferential locating surface on the non-rotating sealing ring which engages a cooperating circumferential surface on the non-rotating race. The circumferential surfaces may extend axially.

The non-rotating sealing ring may also have a radially extending surface which engages a corresponding radially extending surface of the non-rotating race to provide axial location of the non-rotating sealing ring with respect to the non-rotating race.

In another embodiment, the non-rotating sealing ring may be fixed to the non-rotating race, for example by welding.

The non-rotating sealing ring may comprise a main body, which makes the sealing contact with the rotating sealing feature on the rotatable component, and an extension which projects from the main body and engages or is fixed to the non-rotating race to provide the radial and optionally axial support of the non-rotating sealing ring.

An arrangement in accordance with the present invention is applicable to any air-sealed bearing chamber. In one specific embodiment in accordance with the present invention, the assembly is part of a gas turbine engine, and the rotatable component comprises a shaft of the engine. The support structure may be supported by a casing of the engine by an array of stator vanes.

Figure 2:
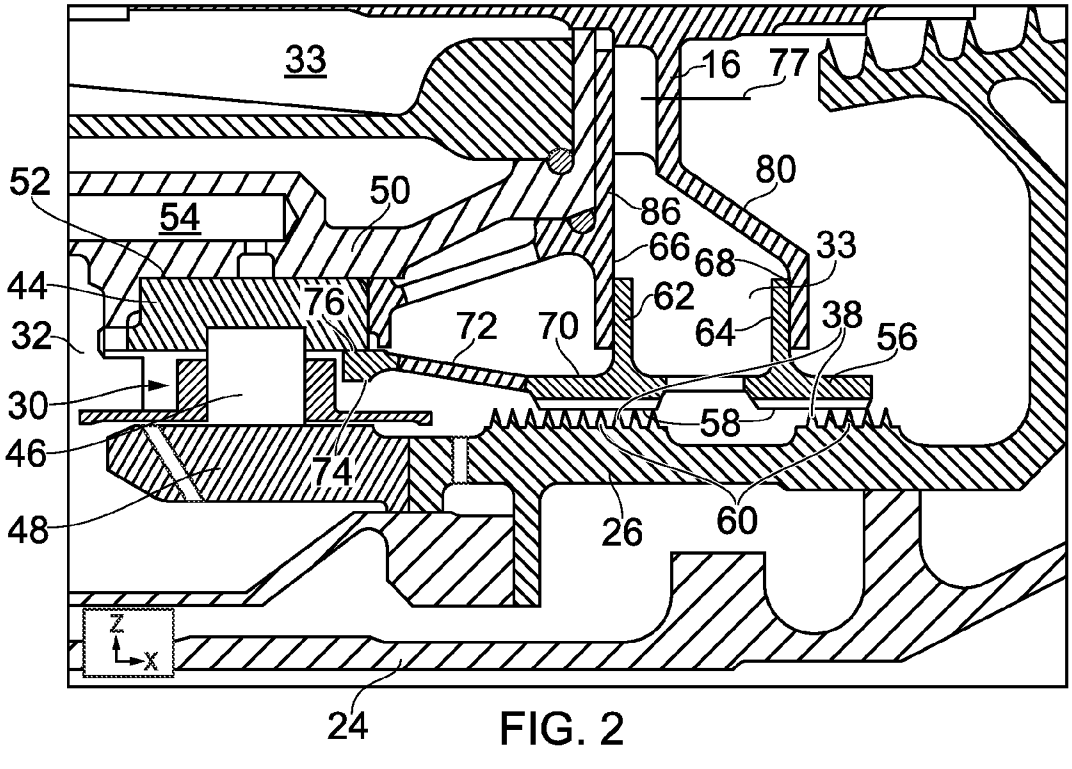
Figure 3:
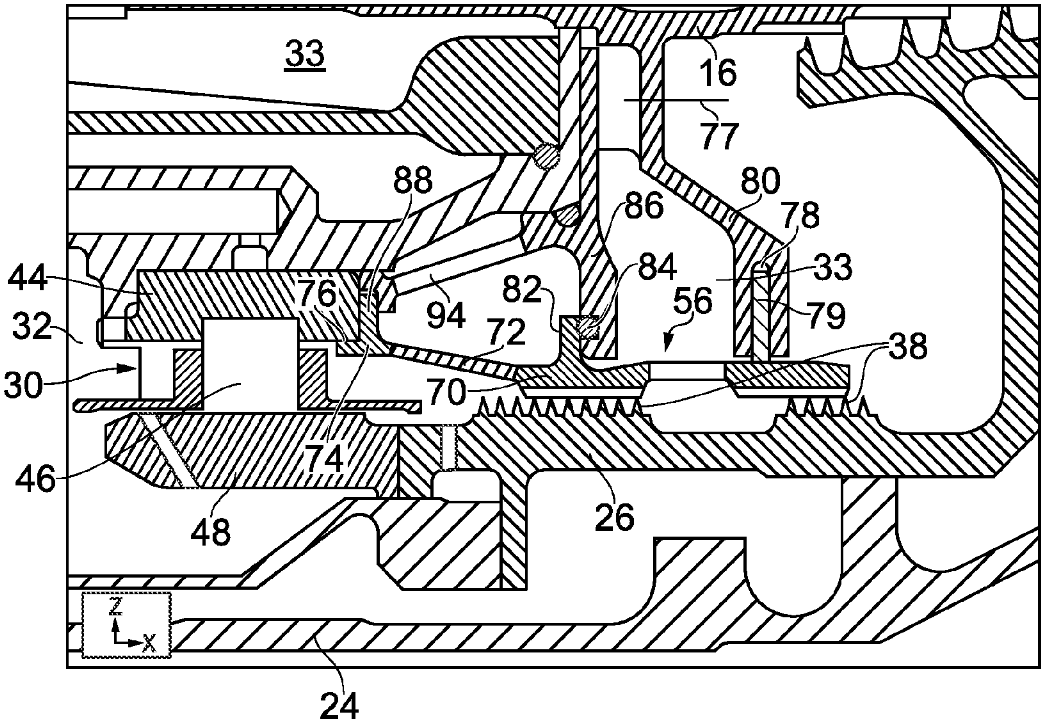
Figure 4:
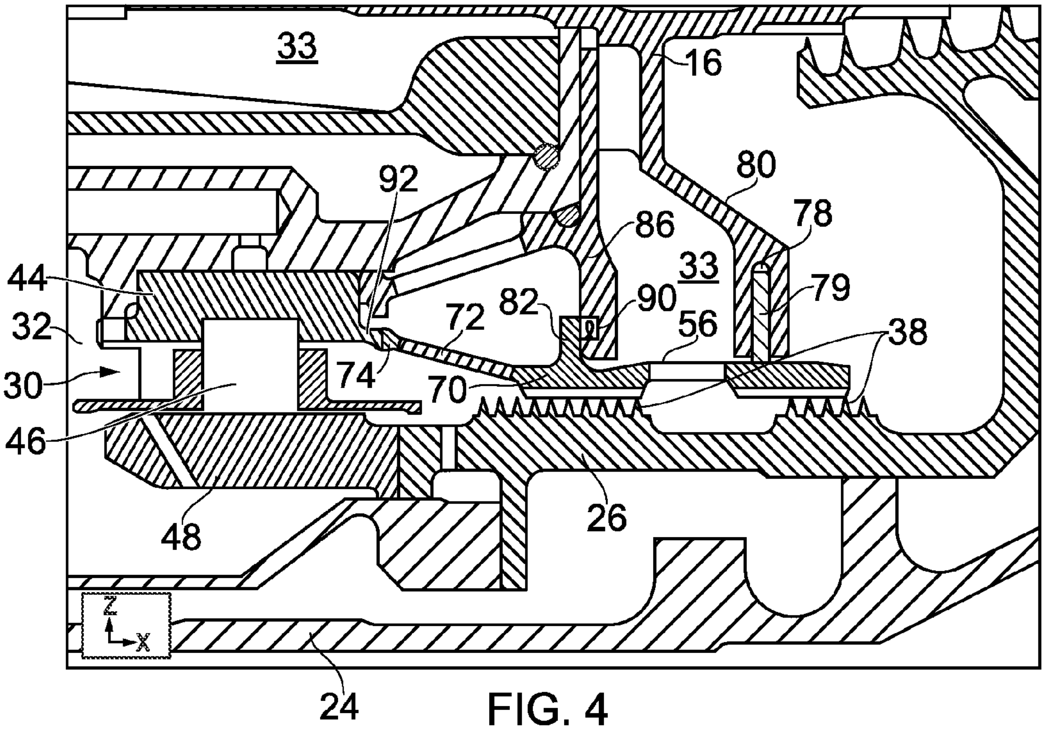

For a better understanding of the present invention, and to show more clearly how it may be carried into effect, reference will now be made, by way of example, to the accompanying drawings, in which:

FIG. 1, as referred to above, shows part of a turbine section of a known gas turbine engine;

FIG. 2 shows part of the structure enclosed by the ellipse II in FIG. 1, illustrating an assembly in accordance with the present invention; and FIGS. 3 and 4 correspond to FIG. 2 but show alternative embodiments in accordance with the present invention.

In the assembly shown in FIG. 2, the support structure 16, the IP shaft 24 and its extension 26, the bearing 30 and the sealing arrangement 38 are disposed in generally the same manner as in the assembly shown in FIG. 1. Although the corresponding parts associated with the HP shaft 20 are not shown in FIG. 2, it will be appreciated that the bearing 28 and the sealing arrangement 40 may be constructed in a similar manner to the bearing 30 and the sealing arrangement 38, and consequently may also be in accordance with the present invention.

Referring to FIG. 2, the bearing 30 comprises an outer, non-rotating, race 44. An array of rolling elements, exemplified by a roller 46, is disposed between the non-rotating race 44 and a part 48 of the extension 26, which serves as an inner, rotating, race of the bearing 30. Although, in the embodiment shown in FIG. 2, the rollers 46 rotate directly on the part 48 of the extension 26, it will be appreciated that, in other embodiments, a separate race, similar to the non-rotating race 44, may be fitted to the extension 26.

The non-rotating race 44 is accommodated in a bearing housing 50 which is part of the support structure 16. The non-rotating race 44 fits in the bearing housing 50 with some clearance, and the resulting gap 52 between the bearing housing 50 and the non-rotating race 44 is filled with oil supplied through a duct 54. Consequently, in operation of the engine, radial motion of the rotating IP shaft 24 squeezes the oil film in the gap 52 to damp the radial motion and so minimise the dynamic loads transmitted from the shaft 24 to the bearing housing 50 and the rest of the support structure 16.

The sealing arrangement 38 comprises a non-rotating sealing ring 56 having sealing surfaces 58, which may be provided by an abradable coating on the substrate material of the non-rotating sealing ring 56. The surfaces 58 are engaged by sealing features 60 on the extension 26 of the IP shaft 24, these sealing features comprising circumferential fins so that the overall seal 38 constitutes a labyrinth seal.

The sealing ring 56 has a pair of circumferential ribs 62, 64 which are disposed between axial support faces 66, 68 formed on inwardly extending circumferential webs 86, 80 of the support structure 16. The ribs 62, 64 have axial support faces which contact the respective axial support faces 66, 68 of the support structure 16 to locate the non-rotating sealing ring 56 in the axial direction while permitting radial displacement. In the context of this specification, expressions such as "radial" and "axial" refer to the main axis of the rotatable component, constituted in the embodiment of FIG. 2 by the rotational axis of the IP shaft 24.

The non-rotating sealing ring 56 comprises a main body 70, on which the sealing surfaces 58 are provided, and an extension 72 which is directed towards the non-rotating race 44 and terminates at a locating body 74, having a circumferential locating surface 76, which extends axially. The locating surface 76 engages the inner circumferential surface of the non-rotating bearing 44.

It will be appreciated that the support structure 16 is assembled from various components, and this enables the non-rotating sealing ring 56 to be installed with the ribs 62, 64 between the radial support faces 66, 68 during assembly of the support structure 16, for example by means of bolts represented by a bolt location 77.

Suitable means (not shown) may be provided to prevent relative rotation between the non-rotating sealing ring 56 and the support structure 16.

It will be appreciated that, in the assembly represented in FIG. 2, the non-rotating sealing ring 56 is able to move, or deflect, in the radial direction with respect to the support structure 16, by virtue of the sliding motion that can take place between the axial support faces of the ribs 62, 64 and the axial support faces 66, 68 of the support structure 16. However, the engagement of the locating face 76 with the non-rotating race 44 means that the non-rotating sealing ring 56 is supported against radial displacement relative to the bearing race 44. This means that the non-rotating sealing ring 56 follows any radial movement of the IP shaft 24 and the extension 26, for example as the squeeze film in the gap 52 varies in thickness as the IP shaft 24 orbits at the bearing 30. Furthermore, thermal or mechanical effects on the spoked structure 18 and the support structure 16 do not transmit any radial displacement to the non-rotating sealing ring 56. Consequently, any radial movement between the sealing surfaces 58 of the non-rotating sealing ring 56 and the fins 60 is minimised, so reducing wear of the sealing arrangement 38, and preventing excessive leakage across the sealing arrangement 38.

FIG. 3 shows a modified embodiment which shares many features with that of FIG. 2. In the embodiment of FIG. 3, the two circumferential ribs 62, 64 are replaced by a radially resilient ring 79 which is accommodated in a groove 78 in the inwardly projecting web 80 of the support structure 16 and is resiliently biased into sealing contact with the body 70 of the non-rotating sealing ring 56. The resilient ring 79 may be a split ring, in the manner of a piston ring.

The locating body 74 on the extension 72 is provided with a radially extending rib 88, which is axially located between the non-rotating race 44 and a forward extension 94 of the inwardly projecting web 86 of the support structure 16. Radial control of the non-rotating sealing ring 56 is achieved by a radially facing surface 76 of the locating body 74 which contacts the non-rotating race 44.

The non-rotating sealing ring 56 also has a circumferential rib 82 having an axially facing sealing surface which makes sealing contact with a suitably compliant sealing element 84 accommodated within a groove in the inwardly projecting web 86 of the support structure 16.

The resilient ring 79 needs to be radially compressed for insertion into the groove 78. To assist this, the gap in the ring may be scarfed rather than radial, and the radially outward end of the ring may then be entered first into the groove 78. Alternatively, any conventional ring installation process may be used, if the ring is provided with suitable features. Although some leakage may occur at the ring gap, this is acceptable at the position of the ring 79.

In operation of the embodiment of FIG. 3, the non-rotating sealing ring 56 is located both axially and radially with respect to the non-rotating race 44, and consequently with respect to the IP shaft 24 and its extension 26. The non-rotating sealing ring 56 can displace or deflect with respect to the support structure 16, this being accompanied by movement of the piston ring seal 79 axially over the non-rotating sealing ring 56 and radially in the slot 78. The sealing element 84 provides axially and radially compliant oil chamber sealing between the support structure 16 and the non-rotating sealing ring 56.

The embodiment shown in FIG. 4 is similar in many respects to that of FIG. 3, and in particular also employs the piston ring seal 79 accommodated in the slot 78. In the embodiment of FIG. 4, the sealing element 84, which may, for example, be made from an elastomeric material or other material which is capable of bulk compression under the action of the lip 82, is replaced by a more temperature capable metallic sealing element 90 which may, for example, be in the form of an ω seal. It will be appreciated that a sealing element corresponding to the sealing elements 84 and 90, acting between a lip 82 and a web of the support structure 16, may be provided in the embodiment of FIG. 2.

Also, the locating body 74 in the embodiment of FIG. 4 is fixed, for example by welding, to the non-rotating race 44, which has an extension 92 for this purpose.

In all of the embodiments of FIGS. 2 to 4, the location of the non-rotating sealing ring 56 with respect to the non-rotating race 44 has the result that relatively tight running clearances can be achieved at the sealing arrangement 38, and specifically, in the embodiments of FIGS. 2 to 4, between the fins 60 and the sealing surfaces 58. As a result, ventilation and buffering air supplied to the chamber 32 defined within the support structure 16 can be employed to best effect to retain positive oil sealing and minimise the temperature of the oil in the bearings 28, 30 with minimal uncontrolled loss of buffering air at the sealing arrangements 36, 38.

The features of the present invention as described in FIGS. 2 to 4 can be employed in new engine designs to provide adequate buffering in higher temperature and pressure environments with lower ventilation flows, and can also be retrofitted to existing engines.

It will be appreciated that the principles underlying the present invention can be employed not only with labyrinth seals as shown in FIGS. 2 to 4, but also with other seal types, such as carbon, brush and leaf seals. Also, the invention can be employed in environments other than gas turbine engines, for example in electrical generators and motors.

The invention claimed is:

1. An assembly comprising:

a rotatable component supported by a bearing for rotation relative to a support structure, the bearing comprising a rotating race which is rotatable with the rotatable component and a non-rotating race carried by the support structure; and a sealing arrangement comprising a non-rotating sealing ring, the non-rotating sealing ring making sealing contact with a rotating sealing feature on the rotatable component, the non-rotating sealing ring making contact with the non-rotating race, the non-rotating sealing ring having a first section with an extension that is connected directly to the non-rotating race that prevents the first section from moving relative to the non-rotating race in a radial direction, and the non-rotating sealing ring having a second section with a radially-extending rib that allows the second section to move relative to the support structure in the radial direction and that prevents the second section from moving relative to the support structure in an axial direction.

2. An assembly as claimed in claim 1, in which the non-rotating sealing ring engages the support structure at cooperating axial support faces on the support structure and the non-rotating sealing ring.

3. An assembly as claimed in claim 2, in which the support structure has a pair of axially spaced-apart circumferential webs, each having an axial support face which is contacted by an axial support face on a respective radially-extending rib on the non-rotating sealing ring.

4. An assembly as claimed in claim 3, in which the ribs on the non-rotating sealing ring engage the respective webs on the support structure on opposite sides from each other.

5. An assembly as claimed in claim 4, in which the ribs on the non-rotating sealing ring are disposed between the webs on the support structure.

6. An assembly as claimed in claim 1, in which a radially resilient ring is received in a groove in the support structure and is in sealing contact with the non-rotating sealing ring.

7. An assembly as claimed in claim 2, in which sealing means may be provided, comprising a sealing element retained in a circumferential groove in an axially facing surface of one of the components which engages an axially facing sealing surface of the other component.

8. An assembly as claimed in claim 1, in which the sealing arrangement comprises a labyrinth seal, the rotating sealing feature comprising circumferential fins which engage a surface on the non-rotating sealing ring.

9. An assembly as claimed in claim 1, in which the radial support of the non-rotating sealing ring by the non-rotating race is achieved by a circumferential surface on the non-rotating sealing ring which engages a cooperating circumferential surface on the non-rotating race.

10. An assembly as claimed in claim 9, in which the circumferential surfaces extend axially.

11. An assembly as claimed in claim 9, in which the non-rotating sealing ring has a radially extending surface which engages a corresponding radially extending surface of the non-rotating race to provide axial location of the non-rotating sealing ring with respect to the non-rotating race.

12. An assembly as claimed in claim 1, in which the non-rotating sealing ring is fixed to the non-rotating race.

13. An assembly as claimed in claim 1, in which the non-rotating sealing ring comprises a main body, which makes the sealing contact with the rotating sealing feature on the rotatable component.

14. An assembly as claimed in claim 1, the assembly being part of a gas turbine engine, and the rotatable component comprising a shaft of the engine.

* * * * *